United States Patent
Shiokawa et al.

(10) Patent No.: US 10,122,030 B2
(45) Date of Patent: Nov. 6, 2018

(54) FUEL CELL SYSTEM AND METHOD OF CONTROLLING OPERATION OF FUEL CELL

(71) Applicant: TOYOTA JIDOSHA KABUSHIKI KAISHA, Toyota-shi, Aichi-ken (JP)

(72) Inventors: Satoshi Shiokawa, Okazaki (JP); Tetsuya Bono, Miyoshi (JP); Osamu Hamanoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 317 days.

(21) Appl. No.: 14/976,440

(22) Filed: Dec. 21, 2015

(65) Prior Publication Data

US 2016/0190613 A1 Jun. 30, 2016

(30) Foreign Application Priority Data

Dec. 26, 2014 (JP) .................. 2014-263908

(51) Int. Cl.
| | |
|---|---|
| H01M 8/04 | (2016.01) |
| H01M 8/02 | (2016.01) |
| H01M 8/04119 | (2016.01) |
| H01M 8/04828 | (2016.01) |
| H01M 8/0432 | (2016.01) |
| H01M 8/04746 | (2016.01) |
| H01M 8/04007 | (2016.01) |

(Continued)

(52) U.S. Cl.
CPC ..... *H01M 8/04126* (2013.01); *H01M 8/0432* (2013.01); *H01M 8/04067* (2013.01); *H01M 8/04201* (2013.01); *H01M 8/04641* (2013.01); *H01M 8/04761* (2013.01); *H01M 8/04828* (2013.01); *H01M 8/04835* (2013.01); *H01M 8/04634* (2013.01); *H01M 8/04753* (2013.01)

(58) Field of Classification Search
CPC ............... H01M 8/04; H01M 8/04067; H01M 8/04126; H01M 8/04201; H01M 8/0432
See application file for complete search history.

(56) References Cited

U.S. PATENT DOCUMENTS

| 5,853,910 A * | 12/1998 | Tomioka | ........... H01M 8/04097 429/415 |
|---|---|---|---|
| 2013/0157158 A1* | 6/2013 | Kagami | ............ H01M 8/04358 429/430 |

(Continued)

FOREIGN PATENT DOCUMENTS

JP 2014-60068 4/2014

*Primary Examiner* — Kenneth J Douyette
(74) *Attorney, Agent, or Firm* — Finnegan, Henderson, Farabow, Garrett & Dunner, LLP

(57) ABSTRACT

A fuel cell system includes a fuel cell including an electrolyte membrane, a sensor configured to measure a temperature of the fuel cell, and a controller. The controller is configured to cause the fuel cell to perform a wet operation to increase a water balance at a cathode of the fuel cell to a value higher than a water balance at the cathode during a normal operation of the fuel cell, when the temperature of the fuel cell measured by the sensor is maintained at a first threshold temperature or higher for a prescribed period of time or longer and then the temperature of the fuel cell decreases to below a second threshold temperature that is equal to or lower than the first threshold temperature.

7 Claims, 4 Drawing Sheets

(51) Int. Cl.
*H01M 8/04082* (2016.01)
*H01M 8/04537* (2016.01)

(56) References Cited

U.S. PATENT DOCUMENTS

2013/0189595 A1\* 7/2013 Izuhara .............. H01M 8/04119
 429/413
2014/0080024 A1 3/2014 Igarashi et al.

\* cited by examiner

FUEL CELL SYSTEM AND METHOD OF CONTROLLING OPERATION OF FUEL CELL

INCORPORATION BY REFERENCE

The disclosure of Japanese Patent Application No. 2014-263908 filed on Dec. 26, 2014 including the specification, drawings and abstract is incorporated herein by reference in its entirety.

BACKGROUND OF THE INVENTION

1. Field of the Invention

The invention relates to control of the dry-wet state of an electrolyte membrane of a fuel cell.

2. Description of Related Art

Electrolyte membranes used in fuel cells (e.g., polymer electrolyte fuel cells) exhibit high power generating performance in a highly wet state. Hence, there are fuel cell systems in which whether an electrolyte membrane is in a dry state or in a wet state is determined, and when the electrolyte membrane is determined to be in the dry state, the electrolyte membrane is moistened by cooling a fuel cell to reduce the evaporation of water. Japanese Patent Application Publication No. 2014-60068 (JP 2014-60068 A) describes a fuel cell system including a fuel cell and a radiator fan. In the fuel cell system in JP 2014-60068 A, an impedance of an electrolyte membrane is measured, and whether the electrolyte membrane is in a dry state or in a wet state is determined based on the measured value. When the electrolyte membrane of the fuel cell is determined to be in the dry state, a coolant circulating through the fuel cell is cooled by fully operating the radiator fan to cool the fuel cell.

However, a large amount of heat is applied to the electrolyte membrane before the electrolyte membrane is brought into the dry state, in some cases. In such a case, even when the fuel cell is cooled after the electrolyte membrane is determined to be in the dry state, drying of the electrolyte membrane further proceeds so that the electrolyte membrane remains in the dry state over a long period of time.

SUMMARY OF THE INVENTION

The invention provides a technique for preventing prolonged drying of an electrolyte membrane of a fuel cell.

An aspect of the invention relates to a fuel cell system including: a fuel cell including an electrolyte membrane; a sensor configured to measure a temperature of the fuel cell; and a controller configured to cause the fuel cell to perform a wet operation to increase a water balance at a cathode of the fuel cell to a value higher than a water balance at the cathode during a normal operation of the fuel cell, when the temperature of the fuel cell measured by the sensor is maintained at a first threshold temperature or higher for a prescribed period of time or longer and then the temperature of the fuel cell decreases to below a second threshold temperature that is equal to or lower than the first threshold temperature. With the fuel cell system according to the above aspect, the wet operation is performed when the fuel cell temperature is maintained at the first threshold temperature or higher for the prescribed period of time or longer and then the fuel cell temperature decreases to below the second threshold temperature. Thus, when there is a high probability that the electrolyte membrane will enter the dry state, the wet operation is started earlier than in a case where the wet operation is started after the electrolyte membrane is determined to be in the dry state based on the measured value of an index that indicates the dry state of the electrolyte membrane, such as the impedance of the fuel cell. Even when the electrolyte membrane re-enters the dry state after coming out of the dry state, drying of the electrolyte membrane is prevented from further proceeding. Thus, the prolonged drying of the electrolyte membrane is prevented.

The fuel cell system according to the above aspect may further include: a cathode off-gas discharging passage disposed in the fuel cell; and a pressure regulator configured to regulate a pressure in the cathode off-gas discharging passage. The controller may be configured to cause the fuel cell to perform the wet operation by controlling the pressure regulator such that the pressure in the cathode off-gas discharging passage is increased to a value higher than a pressure in the cathode off-gas discharging passage during the normal operation of the fuel cell. With the fuel cell system having this configuration, the pressure in the cathode-off gas discharging passage during the wet operation is increased to a value higher than that during the normal operation of the fuel cell, and thus the amount of water carried off by the cathode off-gas is made smaller than that during the normal operation. Thus, under the same operation conditions other than the pressure in the cathode off-gas discharging passage, the water balance at the cathode is made higher than that during the normal operation.

The fuel cell system according to the above aspect may further include a cathode reactant gas supplier configured to supply a cathode reactant gas to the fuel cell. The controller may be configured to cause the fuel cell to perform the wet operation by controlling the cathode reactant gas supplier such that a flow rate of the cathode reactant gas to be supplied to the fuel cell is decreased to a value lower than a flow rate of the cathode reactant gas to be supplied to the fuel cell during the normal operation of the fuel cell. With the fuel cell system having this configuration, the flow rate of the cathode reactant gas to be supplied to the fuel cell during the wet operation is decreased to a value lower than that during the normal operation of the fuel cell, and thus the amount of water carried off by the cathode off-gas is made smaller than that during the normal operation. Thus, under the same operation conditions other than the flow rate of the cathode reactant gas to be supplied to the fuel cell, the water balance at the cathode is made higher than that during the normal operation.

The fuel cell system according to the above aspect may further include: an anode reactant gas supplying passage through which an anode reactant gas is supplied to the fuel cell; an anode off-gas discharging passage through which an anode off-gas from the fuel cell is discharged; a circulation passage that connects the anode reactant gas supplying passage and the anode off-gas discharging passage to each other; a pump disposed on the circulation passage, the pump being configured to supply at least a portion of the anode off-gas to the anode reactant gas supplying passage; a cathode reactant gas supplying passage through which a cathode reactant gas is supplied to the fuel cell; and a cathode off-gas discharging passage through which a cathode off-gas from the fuel cell is discharged. The cathode reactant gas may be supplied to one side of the electrolyte membrane of the fuel cell and the anode reactant gas may be supplied to the other side of the electrolyte membrane of the fuel cell, and a direction in which the cathode reactant gas is supplied to the fuel cell may be opposite to a direction in which the anode reactant gas is supplied to the fuel cell. The controller may be configured to cause the fuel cell to perform the wet operation by controlling the pump such that a flow rate of the anode off-gas in the circulation passage is increased to a value higher than a flow rate of the anode off-gas in the circulation passage during the normal operation of the fuel cell. With the fuel cell system having this configuration, the flow rate of the anode off-gas in the circulation passage is increased during the wet operation, leading to an increase in the amount of the anode reactant gas to be supplied to the fuel cell. Thus, the water that has diffused from the downstream portion of the cathode through the electrolyte membrane to the upstream portion of the anode is transferred from the upstream portion of the anode to the downstream portion thereof by a larger amount than during the normal operation. Thus, the water diffuses from the downstream portion of the anode through the electrolyte membrane to the upstream portion of the cathode more easily than during the normal operation. Thus, under the same operation conditions other than the flow rate of the anode off-gas in the circulation passage, the water balance at the cathode is made higher than that during the normal operation.

The fuel cell system according to the above aspect may further include: an impedance meter configured to measure an impedance of the fuel cell. The controller may be configured to start control for causing the fuel cell to perform the wet operation when the impedance measured by the impedance meter is a prescribed value or lower and the temperature of the fuel cell measured by the sensor is decreased from a temperature equal to or higher than the second threshold temperature to a temperature lower than the second threshold temperature. With the fuel cell system having this configuration, even when the impedance is the prescribed value or lower, the wet operation is started when the temperature of the fuel cell decreases from a temperature equal to or higher than the second threshold temperature to a temperature lower than the second threshold temperature. Thus, the wet operation is started regardless of the current dry-wet state of the electrolyte membrane, resulting in prevention of excessive drying of the electrolyte membrane.

In the fuel cell system according to the above aspect, the first threshold temperature may be a temperature at a boundary between a temperature range in which the water balance is a positive value and a temperature range in which the water balance is a negative value, under the same operation conditions other than the temperature of the fuel cell. When the temperature of the fuel cell exceeds the first threshold temperature, the water balance becomes a negative value. When the water balance is maintained in this state, drying of the electrolyte membrane proceeds. With the fuel cell system having this configuration, the wet operation is performed when the temperature of the fuel cell is maintained at the first threshold temperature or higher for a prescribed period of time or longer. Thus drying of the electrolyte membrane is prevented more reliably than when the first threshold temperature is set to a value higher than the temperature at the boundary.

The fuel cell system according to the above aspect may further include: an impedance meter configured to measure an impedance of the fuel cell. The controller may be configured to start control for causing the fuel cell to perform the wet operation when the temperature of the fuel cell measured by the sensor is decreased from a temperature equal to or higher than the second threshold temperature to a temperature lower than the second threshold temperature. The controller may be configured to terminate the control for causing the fuel cell to perform the wet operation when any one of three conditions i) to iii) is satisfied: i) the temperature of the fuel cell re-increases to the first threshold temperature or higher, ii) the impedance of the fuel cell measured by the impedance meter increases to a value equal to or higher than a prescribed threshold that indicates a dry state of the fuel cell and then decreases to below the threshold, after the fuel cell starts to perform the wet operation; and iii) a prescribed period of time has elapsed after the fuel cell starts to perform the wet operation. With the fuel cell system having this configuration, the wet operation is terminated in an appropriate state, such as a state where the electrolyte membrane is determined to be no longer in the dry state or a state where the electrolyte membrane is allowed to be re-dried.

The invention may be implemented in various forms. For example, the invention may be applied to a vehicle including a fuel cell system, a method of controlling the operation of the fuel cell, a method of controlling a fuel cell system, computer programs for implementing these methods, or recording media containing these programs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
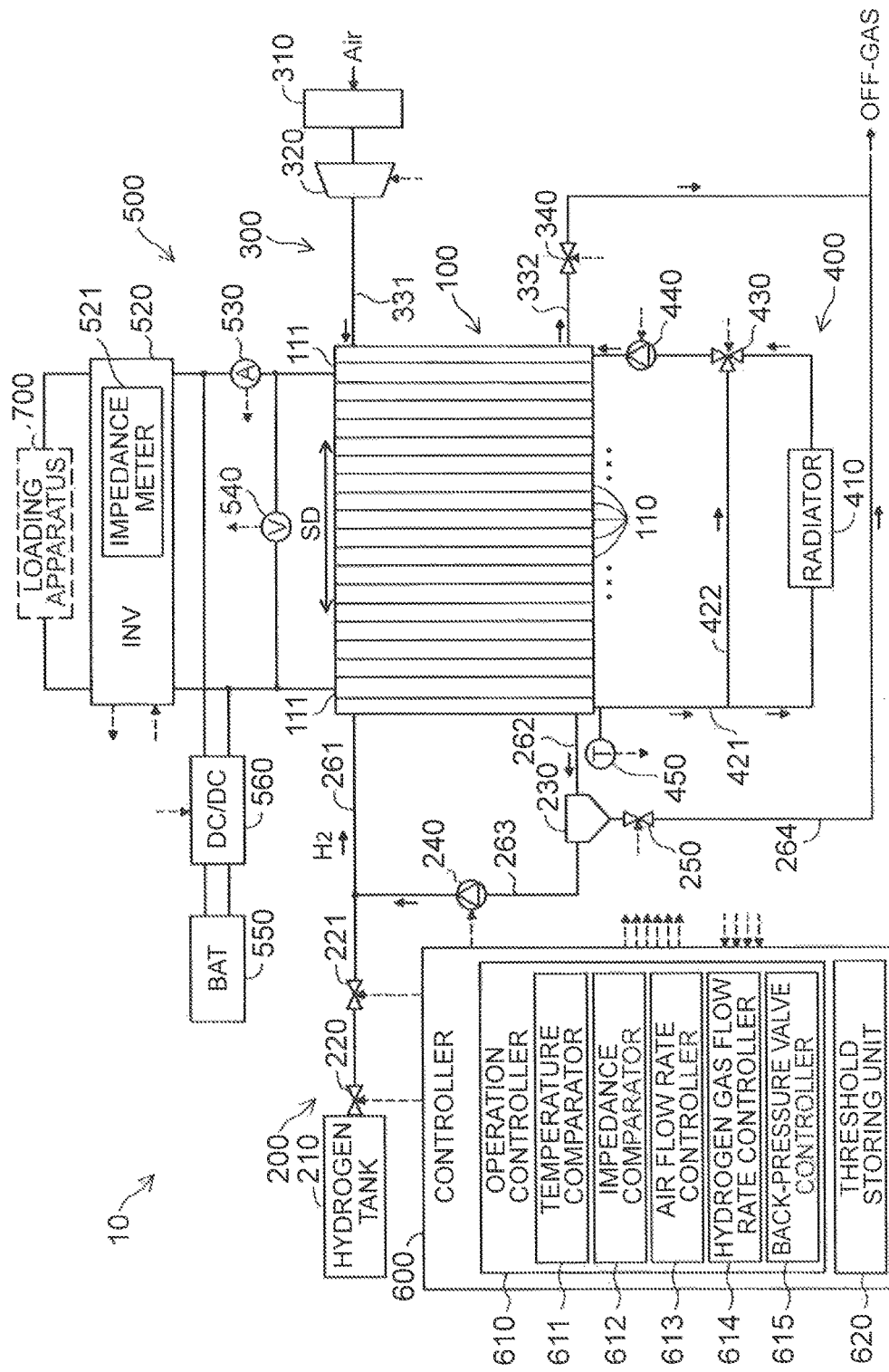
FIG. 1 is a schematic block diagram of the configuration of a fuel cell system according to a first embodiment of the invention.

Hereinafter, a fuel cell system according to a first embodiment of the invention will be described with reference to the accompanying drawings. The fuel cell system has a configuration as described below. FIG. 1 is a schematic block diagram of the fuel cell system of the first embodiment. The fuel cell system 10 of the first embodiment serves as a driving electric power source, and is mounted and used in a fuel cell vehicle. The fuel cell system 10 includes a fuel cell 100, a fuel gas supplying and discharging system 200, an oxidant gas supplying and discharging system 300, a fuel cell circulation-cooling system 400, an electricity charging and discharging system 500, and a controller 600.

The fuel cell 100 is a polymer electrolyte fuel cell, and includes a cell stack and a pair of current collectors 111. The cell stack is formed of a plurality of cells 110 stacked in a stacking direction SD. The current collectors 111 are disposed outside the respective ends of the cell stack (i.e., one of the current collectors 111 is disposed outside one end of the cell stack, and the other one of the current collectors 11 is disposed outside the other end of the cell stack), and serve as general electrodes. Each of the cells 110 generates electricity through electrochemical reaction between fuel gas supplied to the anode and oxidant gas supplied to the cathode. In the first embodiment, the fuel gas is hydrogen gas, and the oxidant gas is air.

Figure 2:
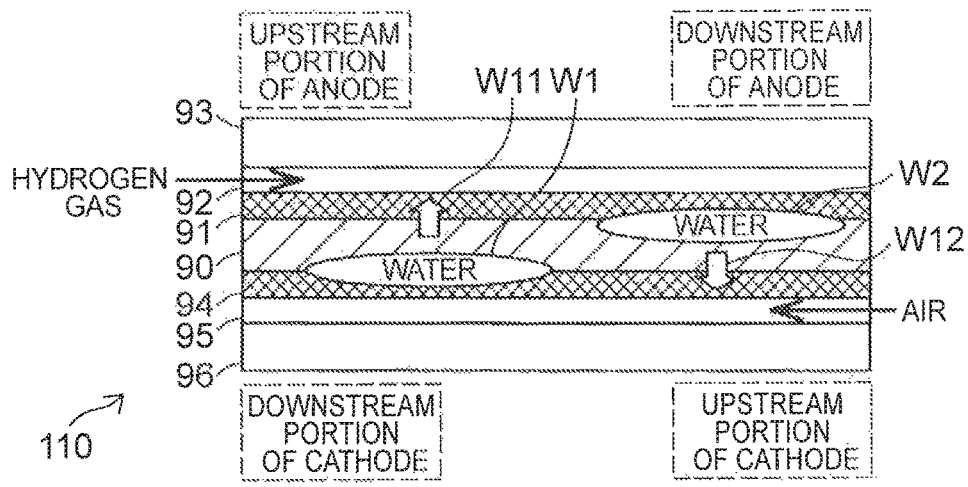
FIG. 2 is a schematic sectional view of the configuration of a cell.

FIG. 2 is a schematic sectional view of the configuration of each cell 110. The cell 110 includes an electrolyte membrane 90, an anode catalyst layer 91, an anode gas diffusion layer 92, an anode separator 93, a cathode catalyst layer 94, a cathode gas diffusion layer 95, and a cathode separator 96.

The electrolyte membrane 90 may be an ion-exchange membrane made of a fluororesin containing sulfonic groups, such as Flemion (registered trademark) or Aciplex (registered trademark). Alternatively, the electrolyte membrane 90 may be a membrane containing ion-exchange groups other than sulfonic groups, such as phosphoric or carboxylic groups. The electrolyte membrane 90 is disposed between the anode catalyst layer 91 and the cathode catalyst layer 94. Each of the anode catalyst layer 91 and the cathode catalyst layer 94 is formed of a member in which catalysts are supported on conductive particles and an ionomer serving as a proton conductor. The catalyst may be platinum or an alloy of platinum and a metal such as ruthenium or iron. The conductive particles may be carbon particles, such as carbon black, or carbon fibers. The ionomer may be a fluororesin containing sulfonic groups. The anode gas diffusion layer 92 is disposed on the opposite side of the anode catalyst layer 91 from the electrolyte membrane 90. The cathode gas diffusion layer 95 is disposed on the opposite side of the cathode catalyst layer 94 from the electrolyte membrane 90. The anode gas diffusion layer 92 and the cathode gas diffusion layer 95 are each formed of a porous material, so that reactant gases (hydrogen gas and air) are diffused in the layers and water produced through, for example, electrochemical reaction is discharged from the layers. Specifically, these layers are formed of a carbon porous material, such as carbon paper or carbon cloth, or a metal porous material, such as metal mesh or metal foam. The anode separator 93 is disposed on the opposite side of the anode gas diffusion layer 92 from the anode catalyst layer 91. The cathode separator 96 is disposed on the opposite side of the cathode gas diffusion layer 95 from the cathode catalyst layer 94. The anode separator 93 and the cathode separator 96 may each be formed of a gas-impermeable conductive material, such as a gas-impermeable high-density carbonaceous material formed through compaction of a carbonaceous material or press-formed metal plate.

The fuel cell 100 includes manifolds (not illustrated) for supplying reactant gases (hydrogen gas and air) and coolant to the cells 110, and manifolds (not illustrated) for discharging off-gases and coolant from the cells 110. Hydrogen gas and air, which are reactant gases, are supplied to the cells 110 so as to form counterflows. As illustrated in FIG. 2, in each cell 110, the hydrogen gas flows on the anode in a direction opposite to the direction of the air that flows on the cathode. Thus, in each cell 110, the inlet of the hydrogen gas (upstream portion of the anode) and the outlet of the air (downstream portion of the cathode) are disposed on opposite sides of the electrolyte membrane 90, and the inlet of the air (upstream portion of the cathode) and the outlet of the hydrogen gas (downstream portion of the anode) are disposed on opposite sides of the electrolyte membrane 90.

In each cell 110, water W1 produced through electrochemical reaction flows toward the downstream portion of the cathode due to the flow of air, and thus the water content of the electrolyte membrane 90 is higher at the downstream portion of the cathode than at the upstream portion thereof. On the other hand, water is not produced through electrochemical reaction at the anode of each cell 110, and thus the water content of the electrolyte membrane 90 is lower on the anode side than on the cathode side. Thus, water (hereinafter, also referred to as "forward diffused water") W11 diffuses through the electrolyte membrane 90 from the downstream portion of the cathode to the upstream portion of the anode. The water W11 diffusing through the electrolyte membrane 90 to the upstream portion of the anode is carried off to the downstream portion of the anode by the flow of hydrogen gas, and water W2 (i.e., a portion of the water W11) is supplied to the electrolyte membrane 90 at the downstream portion of the anode. Thus, the water content of the electrolyte membrane 90 is relatively high at the downstream portion of the anode. As described above, since the water content of the electrolyte membrane 90 is relatively low at the upstream portion of the cathode, water (hereinafter, also referred to as "backward diffused water") W12 diffuses through the electrolyte membrane 90 from the downstream portion of the anode to the upstream portion of the cathode.

Through the fuel gas supplying and discharging system 200 illustrated in FIG. 1, the hydrogen gas is supplied to the fuel cell 100, and anode off-gas from the fuel cell 100 is discharged. The fuel gas supplying and discharging system 200 includes a hydrogen tank 210, a shutoff valve 220, an injector 221, a gas-liquid separator 230, a circulation pump 240, a purge valve 250, a fuel gas supplying passage 261, a first fuel gas discharging passage 262, a fuel gas circulating passage 263, and a second fuel gas discharging passage 264.

The hydrogen tank 210 stores high-pressure hydrogen. Hydrogen gas as a fuel gas is supplied from the hydrogen tank 210 to the fuel cell 100 through the fuel gas supplying passage 261. The shutoff valve 220 is disposed near the fuel gas outlet of the hydrogen tank 210, and selectively allows and interrupts the supply of hydrogen gas from the hydrogen tank 210. The injector 221 is disposed on the fuel gas supplying passage 261, and regulates the amount (flow rate) and pressure of the hydrogen gas to be supplied to the fuel cell 100. The gas-liquid separator 230 is disposed on the first fuel gas discharging passage 262. The gas-liquid separator 230 separates water from the anode off-gas discharged from the fuel cell 100 and discharges the water to the second fuel gas discharging passage 264, and supplies the gas from which the water has been removed (hydrogen gas) to the fuel gas circulating passage 263. The circulation pump 240 is disposed on the fuel gas circulating passage 263, and supplies the fuel gas discharged from the gas-liquid separator 230 to the fuel gas supplying passage 261. When the purge valve 250 disposed on the second fuel gas discharging passage 264 is opened, the water or off-gas separated with the gas-liquid separator 230 is discharged into the atmosphere.

Through the oxidant gas supplying and discharging system 300, air is supplied to the fuel cell 100 and cathode off-gas from the fuel cell 100 is discharged. The oxidant gas supplying and discharging system 300 includes an air cleaner 310, an air compressor 320, a back-pressure valve 340, an oxidant gas supplying passage 331, and an oxidant gas discharging passage 332. The air cleaner 310 removes foreign matter (e.g., dust) from the air with a filter disposed in the air cleaner 310, and supplies the air from which the dust has been removed, to the air compressor 320. The air compressor 320 compresses the air supplied from the air cleaner 310 and supplies the compressed air to the oxidant gas supplying passage 331. The back-pressure valve 340 is disposed on the oxidant gas discharging passage 332, and regulates the pressure in the discharging passage on the cathode of the fuel cell 100 (hereinafter, the pressure will be referred to as "cathode back pressure"). The oxidant gas discharging passage 332 is connected to the second fuel gas discharging passage 264. The water and cathode off-gas flowing through the oxidant gas discharging passage 332 are discharged into the atmosphere together with the water and anode off-gas flowing through the second fuel gas discharging passage 264.

The fuel cell circulation-cooling system 400 regulates the temperature of the fuel cell 100 (hereinafter, will be referred to simply as "fuel cell temperature") by circulating a coolant through the fuel cell 100. The fuel cell circulation-cooling system 400 includes a coolant passage 421, a radiator 410, a bypass passage 422, a three-way valve 430, a circulation pump 440, and a temperature sensor 450.

The coolant passage 421 is disposed outside the fuel cell 100, and is connected to the coolant discharging manifold and the coolant supplying manifold disposed in the fuel cell 100. The radiator 410 is disposed on the coolant passage 421, and cools the coolant discharged from the fuel cell 100 with, for example, air sent from an electric fan (not illustrated). The bypass passage 422 is disposed at an intermediate portion of the coolant passage 421. The bypass passage 422 allows at least a portion of the coolant discharged from the fuel cell 100 to bypass the radiator 410 and to be returned to the fuel cell 100. The downstream end of the bypass passage 422 is connected to the coolant passage 421 with the three-way valve 430. The coolant used in the first embodiment contains an antifreeze, such as ethylene glycol. The cooling medium used in the present embodiment should not be limited to the coolant containing an antifreeze, and may be any heat-exchanging medium, such as air.

The three-way valve 430 regulates the flow rate of the coolant flowing through the coolant passage 421 and the flow rate of the coolant flowing through the bypass passage 422. The circulation pump 440 is disposed on the coolant passage 421, at a position between the three-way valve 430 and the fuel cell 100, and regulates the flow rate of the coolant circulating through the fuel cell circulation-cooling system 400. The temperature sensor 450 is disposed on the coolant passage 421, at a position near the coolant outlet of the fuel cell 100. The temperature sensor 450 measures the temperature of the coolant flowing through the coolant passage 421, and outputs a signal indicating the temperature. In the first embodiment, the temperature measured by the temperature sensor 450 is regarded as a fuel cell temperature.

The electricity charging and discharging system 500 supplies electricity output from the fuel cell 100 or a battery 550 to a loading apparatus 700. In the first embodiment, the loading apparatus 700 is, for example, a vehicle driving motor or any auxiliary machine, and is connected to the anode and cathode current collectors 111 of the fuel cell 100. The electricity charging and discharging system 500 includes an inverter 520, an ammeter 530, a voltmeter 540, a DC-DC converter 560, and the battery 550. The inverter 520 is connected in parallel with the fuel cell 100 and the battery 550, and converts direct current supplied from the fuel cell 100 or the battery 550 into alternating current that is supplied to the loading apparatus 700. The inverter 520 includes an impedance meter 521. The impedance meter 521 measures the impedance of the fuel cell 100 (the electrolyte membrane 90), and outputs a signal indicating the impedance. In the first embodiment, the impedance meter 521 measures a high-frequency impedance by an AC impedance method. The high-frequency impedance corresponds to the resistance of the electrolyte membrane 90 of the cell 110, and correlates with the water content of the electrolyte membrane 90. Specifically, a higher impedance indicates a lower water content of the electrolyte membrane 90, that is, a higher degree of drying of the electrolyte membrane 90. In contrast, a lower impedance indicates a higher water content of the electrolyte membrane 90, that is, a higher degree of wetting of the electrolyte membrane 90. The ammeter 530 measures the current output from the fuel cell 100, and outputs a signal indicating the output current. The voltmeter 540 measures the voltage output from the fuel cell 100, and outputs a signal indicating the output voltage. The DC-DC converter 560 boosts the voltage output from the battery 550, and supplies the boosted voltage to the inverter 520. The DC-DC converter 560 reduces the voltage output from the fuel cell 100, and supplies the voltage to the battery 550, so that excess electricity generated by the fuel cell 100 is stored in the battery 550.

The controller 600 is electrically connected to the shutoff valve 220, the injector 221, the circulation pump 240, the purge valve 250, the air compressor 320, the back-pressure valve 340, the circulation pump 440, the three-way valve 430, the inverter 520, and the DC-DC converter 560. The controller 600 controls these components. The controller 600 is also electrically connected to the temperature sensor 450, and receives a signal indicating the temperature value output from the temperature sensor 450. The controller 600 also receives a signal output from the inverter 520 and indicating the impedance of the fuel cell 100. The controller 600 includes a microcomputer (not illustrated) having a central processing unit (CPU), a read only memory (ROM), and a random access memory (RAM). The controller 600 functions as an operation controller 610 when the CPU executes control programs stored in the ROM. The operation controller 610 includes a temperature comparator 611, an impedance comparator 612, an air flow rate controller 613, a back-pressure valve controller 615, and a hydrogen gas flow rate controller 614.

The temperature comparator 611 compares the measured temperature of the fuel cell 100 with a prescribed threshold temperature in the operation controlling process and wet operation described later. The impedance comparator 612 compares the measured impedance of the fuel cell with a prescribed threshold impedance in the operation controlling process and wet operation described later. In the first embodiment, the prescribed threshold impedance refers to an impedance indicating the dry state of the electrolyte membrane 90. The prescribed threshold temperature will be detailed later. The air flow rate controller 613 controls the amount of air to be supplied to the fuel cell 100 by regulating the rotational speed of the air compressor 320. The hydrogen gas flow rate controller 614 controls the amount of hydrogen gas to be supplied to the fuel cell 100 by regulating the flow rate of hydrogen gas with the circulation pump 240.

The back-pressure valve controller 615 controls the cathode back pressure by regulating the opening degree of the back-pressure valve 340. During the normal operation, the back-pressure valve controller 615 specifies a target cathode back pressure based on a map stored in the ROM (not illustrated) of the controller 600, and regulates the opening degree of the back-pressure valve 340 so as to achieve the target cathode back pressure. In the first embodiment, in the map, the temperature of the fuel cell 100, the output current from the fuel cell 100, and the cathode back pressure are correlated with each other. The cathode back pressure and the opening degree of the back-pressure valve 340 are correlated with each other and set in another map. An increase in the cathode back pressure leads to a reduction in the amount of water (water vapor) carried off by the cathode off-gas. The reason for this will be described below. Because the saturated water vapor pressure at the cathode of the cell 110 has temperature dependent properties, an increase in the pressure at the cathode without any temperature change leads to an increase in the pressure of a component other than water vapor (i.e., a dry component) in the cathode off-gas, but no variation in the pressure of water vapor in the cathode off-gas. This phenomenon reduces the relative pressure of the water vapor in the cathode off-gas, and also reduces the flow rate of the water vapor in the cathode off-gas. This leads to a reduction in the amount of water carried off by the cathode off-gas. Thus, a reduction in the amount of water carried off by the cathode off-gas prevents drying of the electrolyte membrane 90 of each cell 110.

The ROM (not illustrated) of the controller 600 stores the foregoing control program and various maps, and includes a threshold storing unit 620. The threshold storing unit 620 stores, in advance, the foregoing thresholds of temperature and impedance of the fuel cell 100.

In the fuel cell system 10 having the foregoing configuration, execution of the operation controlling process described below prevents excessive drying of the electrolyte membrane 90 of each cell 110 and shortens the period of drying of the electrolyte membrane 90.

The temperature sensor 450 is an example of a sensor in the invention. Similarly, the operation controller 610 is an example of a controller in the invention, the cathode discharging passage of the fuel cell 100 is an example of a cathode off-gas discharging passage in the invention, the back-pressure valve 340 is an example of a pressure regulator in the invention, the air compressor 320 is an example of a cathode reactant gas supplier in the invention, the fuel gas supplying passage 261 is an example of an anode reactant gas supplying passage in the invention, the first fuel gas off-gas discharging passage 262 is an example of an anode off-gas discharging passage in the invention, the fuel gas circulating passage 263 is an example of a circulation passage in the invention, and the circulation pump 240 is an example of a pump in the invention.

Figure 3:
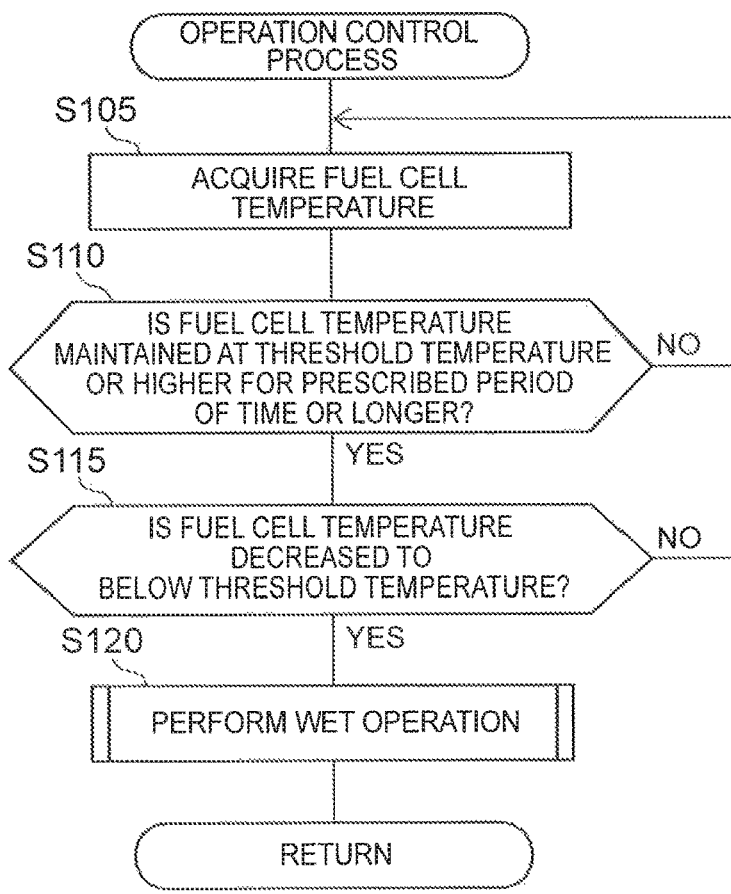
FIG. 3 is a flowchart of an operation controlling process executed in the fuel cell system.

Next, an operation controlling process executed in the fuel cell system 10 will be described. FIG. 3 is a flowchart of the operation controlling process. When an ignition of a fuel cell vehicle including the fuel cell system 10 is turned on, the operation controlling process is executed in the fuel cell system 10.

The temperature comparator 611 receives a signal transmitted from the temperature sensor 450 to acquire the fuel cell temperature (step S105). The temperature comparator 611 stores historical temperature data (i.e., the acquired temperature and the time of acquisition) in the ROM. The temperature comparator 611 compares the fuel cell temperature acquired in step S105 with the threshold temperature stored in the threshold storing unit 620, and determines whether or not the fuel cell temperature is maintained at the threshold temperature or higher for a prescribed period of time or longer based on the results of comparison and the historical temperature data stored in the ROM (step S110). The threshold temperature and the prescribed period of time will be detailed later. For example, when a driver of the fuel cell vehicle largely depresses an accelerator pedal, the fuel cell 100 generates an increased amount of electricity, and the fuel cell temperature increases.

When the fuel cell temperature is determined not to be maintained at the threshold temperature or higher for the prescribed period of time (NO in step S110), the process is returned to step S105. On the other hand, when the fuel cell temperature is determined to be maintained at the threshold temperature or higher for the prescribed period of time or longer (YES in step S110), whether the fuel cell temperature decreases to below the threshold temperature is determined (step S115). In the first embodiment, the threshold temperature in step S115 is equal to that in step S110. The threshold temperature in step S110 is an example of a first threshold temperature in the invention, and the threshold temperature in step S115 is an example of a second threshold temperature in the invention. When the fuel cell temperature is determined not to decrease to below the threshold temperature (NO in step S115), the process is returned to step S105. On the other hand, when the fuel cell temperature is determined to decrease to below the threshold temperature (YES in step S115), the wet operation is performed (step S120). A decrease in the fuel cell temperature from a temperature equal to or higher than the threshold temperature to a temperature below the threshold temperature may occur when, for example, the driver of the fuel cell vehicle reduces the amount of depression of the accelerator pedal.

Figure 4:
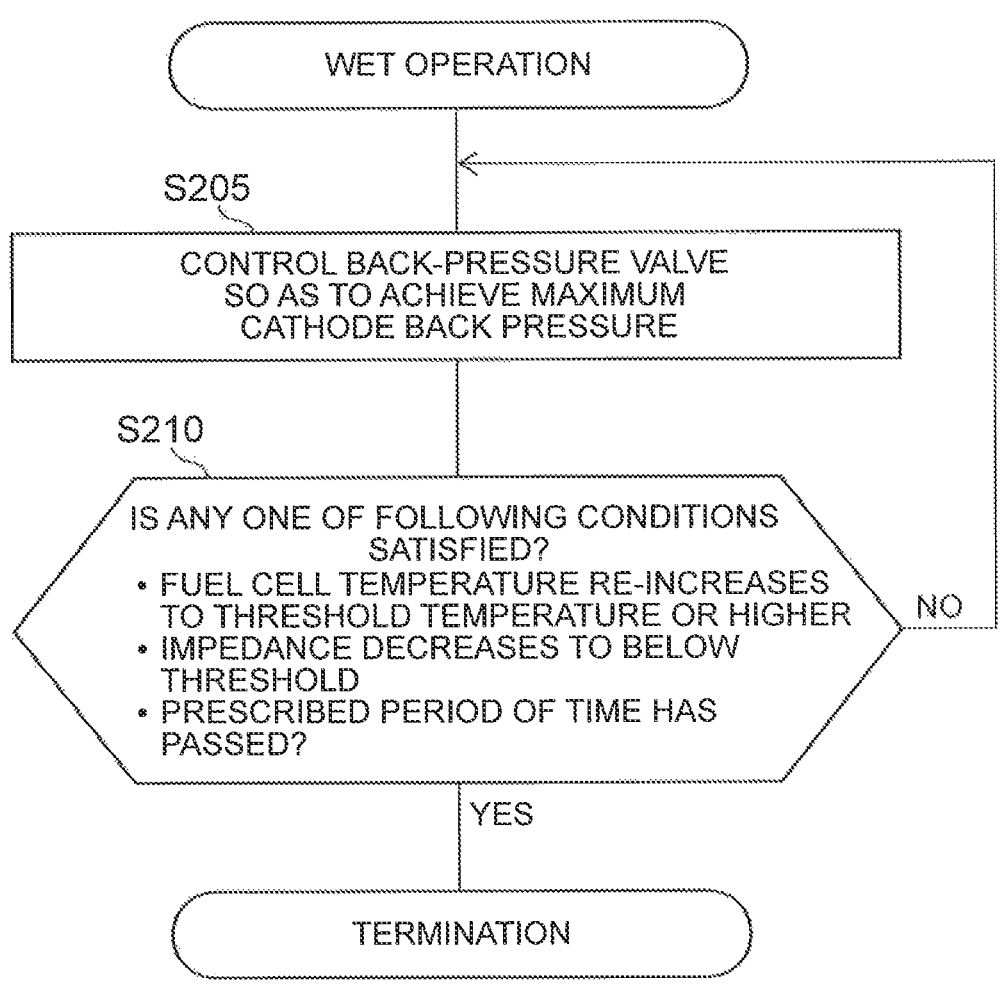
FIG. 4 is a flowchart of a process of a wet operation in the first embodiment.

FIG. 4 is a flowchart of a process of the wet operation in the first embodiment. In the wet operation according to the first embodiment, the back-pressure valve controller 615 controls the back-pressure valve 340 such that the cathode back pressure is adjusted to the maximum possible value achievable by the back-pressure valve 340 (step S205). That is, the cathode back pressure is adjusted to the maximum possible value regardless of the fuel cell temperature and the current output from the fuel cell 100. The operation controller 610 measures the elapsed time after the adjustment of the cathode back pressure to the maximum possible value. Because the cathode back pressure is adjusted to the maximum possible value as described above, the amount of water carried off from the cell 110 by the cathode off-gas is significantly reduced. Thus, execution of step S205 prevents drying of the electrolyte membrane 90 at the cathode.

The back-pressure valve controller 615 determines whether any one of the following three conditions is satisfied (step S210): (condition 1) the fuel cell temperature re-increases to the threshold temperature or higher; (condition 2) the impedance increases to the prescribed threshold or higher and then decreases to below the prescribed threshold; and (condition 3) a prescribed period of time has elapsed after the adjustment of the cathode back pressure to the maximum possible value.

The condition 1 may be satisfied when, for example, the waste heat from the fuel cell 100 re-increases due to re-depression of the accelerator pedal by the driver of the fuel cell vehicle. The condition 2 may be satisfied when the impedance decreases due to reduced drying of the electrolyte membrane 90 in step S205. When none of these three conditions is satisfied (NO in step S210), step S205 is executed. On the other hand, when any one of these three conditions is satisfied (YES in step S210), the wet operation is terminated. As illustrated in FIG. 3, the process is returned to step S105 after the termination of the wet operation. As described below, the impedance temporarily decreases with a decrease in the fuel cell temperature, but then increases and re-decreases due to the effect of step S205. The condition 2 is set such that the wet operation is not terminated when the impedance temporarily decreases to below the prescribed threshold. Before the process is returned to step S105 after termination of the wet operation, a flag is reset, the flag indicating the determination made in step S110, that is, "the fuel cell temperature is maintained at the threshold temperature or higher for the prescribed period of time or longer."

Figure 5A:
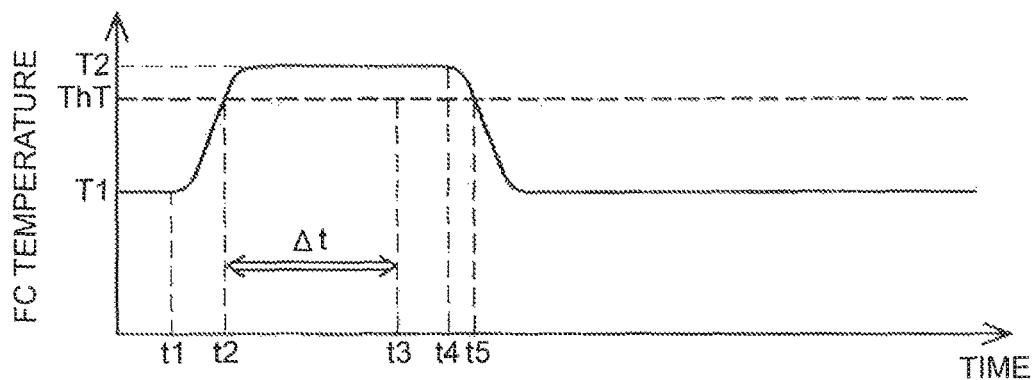
FIG. 5A is a time-series chart illustrating the temperature of a fuel cell during execution of the operation controlling process.
Figure 5B:
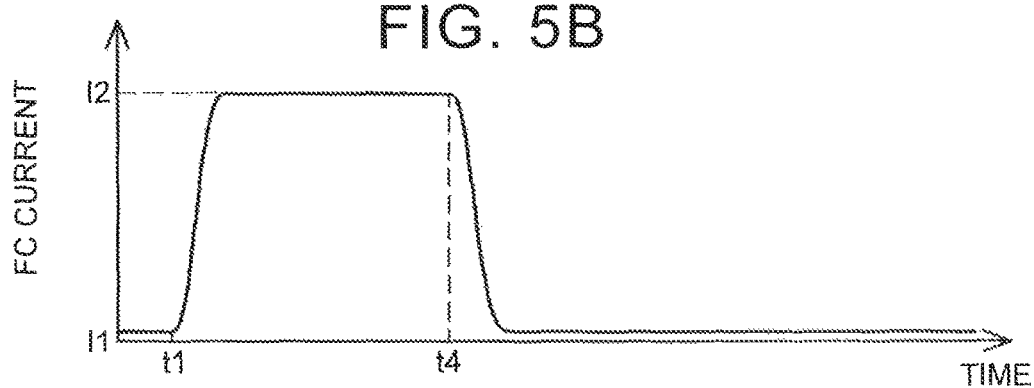
FIG. 5B is a time-series chart illustrating the current output from the fuel cell during execution of the operation controlling process.
Figure 5C:
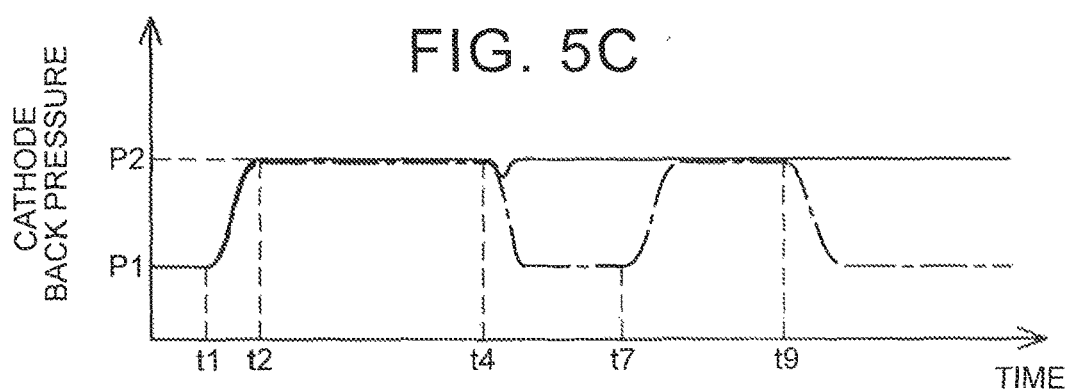
FIG. 5C is a time-series chart illustrating the cathode-back pressure during execution of the operation controlling process.
Figure 5D:
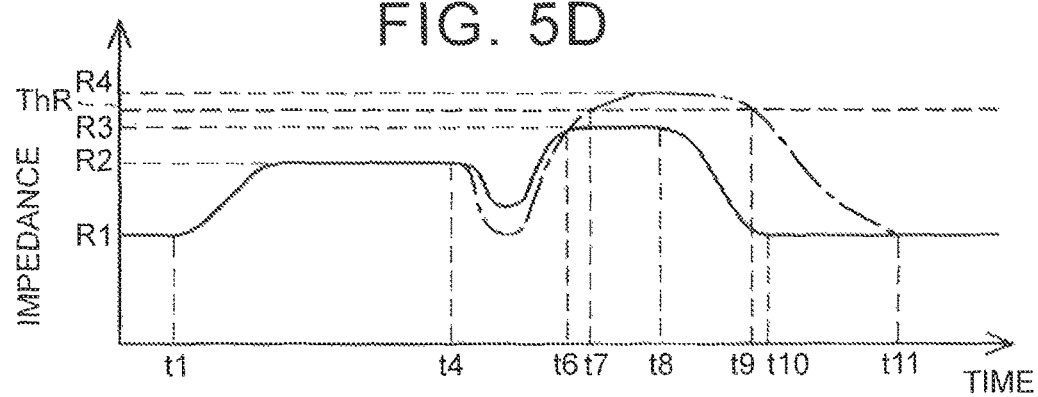
FIG. 5D is a time-series chart illustrating the impedance of the fuel cell during execution of the operation controlling process.

FIG. 5A is a time-series chart illustrating the fuel cell temperature (FC temperature) during the operation controlling process. FIG. 5B is a time-series chart illustrating the output current (FC current) during the operation controlling process. FIG. 5C is a time-series chart illustrating the cathode back pressure during the operation controlling process. FIG. 5D is a time-series chart illustrating the impedance of the fuel cell 100 during the operation controlling process.

In an example illustrated in FIG. 5A to FIG. 5D, the driver fully depresses the accelerator pedal at time t1. In response to the depression of the accelerator pedal, the amount of reactant gases supplied to the fuel cell 100 increases, leading to an increase in the amount of electricity generated by the fuel cell 100. Then, as illustrated in FIG. 5A, the fuel cell temperature starts to increase from a temperature T1 and reaches a threshold temperature ThT at time t2, and then the fuel cell temperature is maintained at a temperature T2 until time t4 at which the driver reduces the amount of depression of the accelerator pedal. At time t3, an elapsed time Δt from time t2, that is, the time that has elapsed after the fuel cell temperature reaches the threshold temperature ThT, becomes equal to or longer than a prescribed period of time. Thus, in step S110, which is executed at or after time t3, the fuel cell temperature is determined to be maintained at the threshold temperature ThT or higher for the prescribed period of time or longer. After the driver reduces the amount of depression of the accelerator pedal at time t4, the amounts of electricity and heat generated by the fuel cell 100 are reduced. Thus, the fuel cell temperature decreases to below the threshold temperature ThT at time t5. After that, the fuel cell temperature reaches the temperature T1, which is the temperature before time t1. As described above, the fuel cell temperature falls below the threshold temperature ThT at time t5. In step S115, which is executed at or after time t5, the fuel cell temperature is determined to be lower than the threshold temperature, and the wet operation is performed.

In the first embodiment, the threshold temperature ThT is set to a temperature at the boundary between the temperature range in which the water balance at the cathode of each cell 110 is a positive value and the temperature range in which the water balance at the cathode of each cell 11 is a negative value, under the same operation conditions other than the fuel cell temperature. The "water balance at the cathode" refers to the value obtained by subtracting the total amount of water discharged from the cathode of the cell 110, from the sum of the amount of water flowing into the cathode and the amount of water produced at the cathode: In the first embodiment, the water balance is calculated by Expression (1):

water balance=the amount of produced water−the amount of carried-off water−the amount of forward diffused water+the amount of backward diffused water. Expression (1):

In Expression (1), "the amount of produced water" refers to the amount of water produced through electrochemical reaction at the cathode; "the amount of carried-off water" refers to the amount of water (water vapor) discharged with the cathode off-gas; "the amount of forward diffused water" refers to the amount of the forward diffused water W11 illustrated in FIG. 2; and "the amount of backward diffused water" refers to the amount of the backward diffused water W12 illustrated in FIG. 2. The amount of carried-off water correlates with the fuel cell temperature. Specifically, an increase in the fuel cell temperature leads to an increase in the saturated water vapor pressure and an increase in the amount of carried-off water, resulting in a decrease in the water balance. In contrast to this, a decrease in the fuel cell temperature leads to a decrease in the saturated water vapor pressure and a decrease in the amount of carried-off water, resulting in an increase in the water balance. The water balance varies depending on the fuel cell temperature, and the water balance becomes zero at a certain fuel cell temperature. Such a fuel cell temperature is specified by experiments, for example, and the specified temperature is stored in advance as the threshold temperature ThT in the threshold storing unit 620. The threshold temperature ThT may be set to, for example, 80° C. The temperature T1 may be set to, for example, 50° C., and the temperature T2 may be set to, for example, 90° C. The elapsed time Δt may be any period of time, such as one second, one minute, or three to five minutes.

As illustrated in FIG. 5B, the output current of the fuel cell 100 starts to increase from a current I1 (at time t1) and reaches a current I2 within a short period of time. Then, the output current starts to decrease at time t4 at which the driver reduces the amount of depression of the accelerator pedal, and reaches the current I1. The current I1 may be set to, for example, 15 to 50 A, and the current I2 may be set to, for example, 300 to 500 A.

As illustrated in FIG. 5C, a variation in the cathode back pressure (the first embodiment) is indicated by a solid line, and a variation in the cathode back pressure (comparative example) is indicated by an alternate long and short dash line. In the comparative example, the cathode back pressure is set basically based on the fuel cell temperature and the output current of the fuel cell 100. In the comparative example, when the impedance of the fuel cell 100 is equal to or higher than a prescribed threshold ThR that indicates the dry state of the electrolyte membrane 90, the cathode back pressure is set to the maximum possible value.

As described above, at time t3, the fuel cell temperature has been maintained at the threshold temperature ThT or higher for the prescribed period of time Δt or longer. Thus, when the fuel cell temperature decreases to below the threshold temperature ThT at time t5, step S205 is executed, and the cathode back pressure is regulated to be the maximum possible value. As illustrated in FIG. 5C, the cathode back pressure gradually increases from a pressure P1 with an increase in the fuel cell temperature and an increase in the output current of the fuel cell 100 from time t1, and reaches a maximum pressure P2 at time t2. Then, the cathode back pressure is maintained at the pressure P2 while the fuel cell temperature and the output current of the fuel cell 100 are maintained constant. The cathode back pressure slightly decreases with a decrease in the fuel cell temperature, but is returned to the maximum pressure P2 in response to the execution of the wet operation at time t4. The cathode back pressure is maintained at the maximum possible value until any one of the foregoing three conditions in step S210 is satisfied. The pressure P1 may be set to, for example, 100 kPa, and the pressure P2 may be set to, for example, 250 kPa.

As illustrated in FIG. 5D, the impedance of the fuel cell 100 (i.e., the degree of drying of the fuel cell 100) gradually increases from the impedance R1 with an increase in the fuel cell temperature, the impedance R1 being a value before time t1, for the following reason. An increase in the fuel cell temperature leads to an increase in the saturated water vapor pressure at the cathode of each cell 110, resulting in an increase in the amount of water vapor carried off by the cathode off-gas. In an example illustrated in FIG. 5D, the impedance of the fuel cell 100 increases to the impedance R2, and then is maintained at this value until time t4 at which the fuel cell temperature starts to decrease. A decrease in the fuel cell temperature started at time t4 leads to a decrease in the impedance of the fuel cell 100. The inventors found the fact that even if the amount of water carried off by the cathode off-gas is reduced by regulating the cathode back pressure to the maximum possible value, the impedance of the fuel cell 100 restarts to increase and drying of the electrolyte membrane 90 further proceeds because the fuel cell temperature is maintained at the threshold temperature ThT or higher for a relatively long period of time (i.e., for the prescribed period of time Δt or longer). In the example illustrated in FIG. 5D, the impedance of the fuel cell 100 restarts to increase and then reaches an impedance R3 at time t6, and is maintained at the impedance R3 until time t8. The impedance of the fuel cell 100 starts to decrease at time t8 and is returned to the impedance R1 (i.e., the value before time t1) at time t10. In the first embodiment, the cathode back pressure is regulated to the maximum possible value when the fuel cell temperature decreases to below the threshold temperature ThT. Thus, as detailed below, the maximum impedance R3 to which the impedance of the fuel cell 100 is re-increased is relatively low, and the period from the time at which the impedance of the fuel cell 100 increases to the impedance R3 to the time at which the impedance of the fuel cell is returned to the impedance R1 (i.e., the period from time t6 to time t10) is relatively short.

As indicated by an alternate long and short dash line in FIG. 5C, in the comparative example, the cathode back pressure starts to decrease at time t4 and is then returned to the pressure P1 (i.e., the value before time t1), and is maintained at the pressure P1 for a while. However, as in the first embodiment, the impedance of the fuel cell 100 re-increases to a prescribed threshold ThR or higher at time t7. In the comparative example, when the impedance of the fuel cell 100 increases to the prescribed threshold ThR or higher, the cathode back pressure is regulated in response to the impedance of the fuel cell 100. Thus, as illustrated in FIG. 5C, the cathode back pressure increases with an increase in the impedance of the fuel cell 100 after time t7, and reaches the maximum pressure P2. As illustrated in FIG. 5D, the impedance of the fuel cell 100 increases even after time t7 and reaches an impedance R4, and is then maintained at the impedance R4 for a while. Then, the impedance of the fuel cell 100 starts to decrease, and returns to the impedance R1 (i.e., the value before time t1) at time t11. As illustrated in FIG. 5C, the impedance of the fuel cell 100 starts to decrease, and then the cathode back pressure decreases to the pressure P1 (i.e., the value before time t1) after time t9 at which the impedance of the fuel cell 100 decreases to below the threshold ThR.

As illustrated in FIG. 5D, the maximum impedance R4 to which the impedance of the fuel cell 100 is re-increased in the comparative example is higher than the maximum impedance R3 in the first embodiment. The period from the time at which the impedance of the fuel cell 100 reaches the impedance R4 to the time at which the impedance thereof returns to the impedance R1 (i.e., the period from time t7 to time t11) in the comparative example is longer than the period from the time at which the impedance of the fuel cell 100 reaches the impedance R3 to the time at which the impedance thereof returns to the impedance R1 in the first embodiment. The cause of this may be as follows. Because the cathode back pressure is decreased with a decrease in the fuel cell temperature, it is not possible to sufficiently obtain the effect of reducing the amount of water carried off by the cathode off-gas. The effect is supposed to be obtained by increasing the cathode back pressure. As a result, drying of the electrolyte membrane 90 significantly proceeds after that.

In contrast to this, in the first embodiment, when the fuel cell temperature is maintained at the threshold temperature ThT or higher for the prescribed period of time Δt or longer and then the fuel cell temperature decreases to below the threshold temperature ThT, the amount of water carried off by the cathode off-gas is reduced by regulating the cathode back pressure to the maximum possible value, regardless of whether the fuel cell 100 is in the dry state (i.e., regardless of whether the impedance of the fuel cell 100 is high). Thus, excessive drying of the electrolyte membrane 90 is prevented. Thus, even when the impedance of the fuel cell 100 increases after a decrease in the fuel cell temperature, the maximum impedance is kept at a relatively low value, and the period of time from when the impedance of the fuel cell reaches the maximum possible value to when the impedance returns to the original value is made short.

In the fuel cell system 10 of the first embodiment described above, the wet operation is performed when the fuel cell temperature is maintained at the threshold temperature ThT or higher for the prescribed period of time Δt or longer and then the fuel cell temperature decreases to below the threshold temperature ThT. Thus, when there is a high probability that the electrolyte membrane 90 will then enter the dry state, the wet operation is started earlier than in a case where the wet operation is started after the electrolyte membrane 90 of each cell 110 is determined to be in the dry state based on the measured impedance of the cell 110. Even when the impedance of the fuel cell 100 increases after a decrease in the fuel cell temperature, the maximum impedance is kept at a low value, and the period of time from when the impedance of the fuel cell reaches the maximum possible value to when the impedance returns to the original value is made short. Thus, excessive drying of the electrolyte membrane 90 of the cell 110 is prevented.

Because the wet operation is performed such that the cathode back pressure is regulated to the maximum possible value, the amount of water carried off by the cathode off-gas is reduced, and excessive drying of the electrolyte membrane 90 of each cell 110 is prevented.

The threshold temperature ThT is set to the temperature at the boundary between the temperature range in which the water balance at the cathode of each cell 110 is a positive value and the temperature range in which the water balance at the cathode of each cell 11 is a negative value. When the fuel cell temperature exceeds the threshold temperature ThT, the water balance becomes a negative value. When the water balance is maintained at a negative value, drying of the electrolyte membrane 90 of the cell 110 proceeds. Thus, the temperature at the boundary is set as the threshold temperature ThT. Therefore, drying of the electrolyte membrane 90 of the cell 110 is prevented more reliably than in a case where the threshold temperature ThT is set to, for example, a value that is higher than the temperature at the boundary.

A fuel cell system according to a second embodiment of the invention will be described below. Because the fuel cell system of the second embodiment has the same system configuration as that of the fuel cell system 10 of the first embodiment, components that are the same as those in the first embodiment will be denoted by the same reference symbols as those in the first embodiment and detailed description thereof will be omitted. The wet operation in the second embodiment differs from that in the first embodiment illustrated in FIG. 4 in the process in step S205. Because the other steps of the wet operation are the same as those in the first embodiment, the steps that are the same as those in the first embodiment will be denoted by the same step numbers as those in the first embodiment and detailed description thereof will be omitted.

In step S205a of the wet operation according to the second embodiment, the air flow rate controller 613 controls the rotational speed of the air compressor 320 such that the flow rate of air to be supplied to the fuel cell 100 is adjusted to a prescribed value (upper limit) or lower. The prescribed value (upper limit) of the flow rate of supply air, which is used in step S205a of the second embodiment, is set so as to satisfy the following condition that "the water balance is higher than that during the normal operation of the fuel cell 100" (hereinafter, the condition will be referred to as "condition A"). As indicated by Expression (1), the water balance at the cathode is increased by decreasing in the amount of water to be carried off. A decrease in the flow rate of air to be supplied to the fuel cell 100 leads to a decrease in the amount of carried-off water, resulting in an increase in the water balance. In the second embodiment, the flow rate of supply air is made smaller to achieve a higher water balance than during the normal operation. As described above, setting the water balance higher than that during the normal operation to makes it possible to prevent drying of the electrolyte membrane 90 of each cell 110 more reliably than during the normal operation.

Under the same operation conditions other than the flow rate of air to be supplied to the fuel cell 100, the amount of carried off water is made smaller than that during the normal operation by setting the flow rate of supply air lower than that during the normal operation. In this way, the water balance is made higher than that during the normal operation. In the second embodiment, as a value that satisfies the condition A, the prescribed flow rate of supply air is set lower than the flow rate of supply air during the normal operation. Under the condition that the current output from the fuel cell 100 is constant, a decrease in the flow rate of supply air leads to a decrease in the air stoichiometric ratio (ratio of air to current). Under such a condition, step S205a may be executed to control the rotational speed of the air compressor 320 such that the air stoichiometric ratio is adjusted to a value equal to or lower than a prescribed value that satisfies the condition A. The "normal operation" refers to an operation of the fuel cell 100 at an air stoichiometric ratio of 1.3 to 1.8, for example. When the fuel cell system 10 is used in a fuel cell vehicle as in the second embodiment, the "normal operation" refers to an operation of the fuel cell 100 while the vehicle is travelling in a normal state. Thus, the "normal operation" excludes an operation of the fuel cell 100 during intermittent or transient driving.

The fuel cell system of the second embodiment described above exhibits advantageous effects similar to those achieved by the fuel cell system 10 of the first embodiment.

A fuel cell system according to a third embodiment of the invention will be described below. Because the fuel cell system of the third embodiment has the same system configuration as that of the fuel cell system 10 of the first embodiment, components that are the same as those in the first embodiment will be denoted by the same reference symbols as those in the first embodiment and detailed description thereof will be omitted. The wet operation in the third embodiment differs from that in the first embodiment illustrated in FIG. 4 in the process in step S205. Because the other steps of the wet operation are the same as those in the first embodiment, the steps that are the same as those in the first embodiment will be denoted by the same step numbers as those in the first embodiment and detailed description thereof will be omitted.

In step S205b of the wet operation according to the third embodiment, the hydrogen gas flow rate controller 614 controls the circulation pump 240 such that the flow rate of hydrogen gas to be supplied to the fuel cell 100 is adjusted to a prescribed value (lower limit) or higher. The prescribed value (lower limit) of the flow rate of supply hydrogen gas, which is used in step S205b of the third embodiment, is set so as to satisfy the condition A in the second embodiment. An increase in the flow rate of hydrogen gas under control of the circulation pump 240 leads to an increase in the amount of a portion of the forward diffused water W11 (see FIG. 2), which is carried off to the downstream portion of the anode by the flow of hydrogen gas, resulting in an increase in the amount of backward diffused water W12. As indicated in Expression (1), an increase in the amount of backward diffused water W12 leads to an increase in the water balance at the cathode. Under the same operation conditions other than the flow rate of hydrogen gas to be supplied to the fuel cell 100, the amount of backward diffused water W12 is made lager than that during the normal operation by setting the flow rate of supply hydrogen gas higher than that during the normal operation. In this way, the water balance is made higher than that during the normal operation. The prescribed flow rate of supply hydrogen gas, which is used in step S205b of the third embodiment, is set higher than that during the normal operation so as to satisfy the condition A. The "normal operation" is as described above in the second embodiment.

The fuel cell system of the third embodiment described above exhibits advantageous effects similar to those achieved by the fuel cell system 10 of the first embodiment.

Modified examples of the foregoing embodiments will be described below. Modified example 1 will be described below. In the first embodiment, the back-pressure valve 340 is controlled such that the cathode back pressure is adjusted to the maximum possible value achievable by the back-pressure valve 340 in step S205 of the wet operation. Alternatively, the invention may include any other embodiment. For example, the back-pressure valve 340 may be controlled such that the cathode back pressure is adjusted to a value higher than that during the normal operation of the fuel cell 100. In this modified example, under the same conditions other than the cathode back pressure, the condition A is satisfied as in the second and third embodiments. That is, this modified example exhibits advantageous effects similar to those achieved by the first embodiment, because the amount of carried-off water is regulated through the adjustment of the cathode back pressure, so that the water balance is made higher than that during the normal operation of the fuel cell 100.

Modified example 2 will be described below. In the foregoing embodiments, the threshold temperature in step S110 is equal to that in step S115. Alternatively, the invention may include any other embodiment. For example, a threshold temperature in step S110 (hereinafter, will be referred to as "first threshold temperature") and a threshold temperature in step S115 (hereinafter, will be referred to as "second threshold temperature") may be set such that the second threshold temperature is equal to or lower than the first threshold temperature. For example, the first threshold temperature may be set to 75° C., 80° C., 85° C., or 90° C., and the second threshold temperature may be set to a temperature equal to or lower than the first threshold temperature, such as 70° C., 75° C., 80° C., 85° C., or 90° C. Thus, the fuel cell system in the invention may employ an operation controller 610 described below. When the fuel cell temperature is maintained at the first threshold temperature or higher for a prescribed period of time or longer, and then the fuel cell temperature decreases to below the second threshold temperature, which is equal to or lower than the first threshold temperature, the operation controller 610 controls the operation of the fuel cell 100 to cause the fuel cell 100 to perform the wet operation in which the water balance at the fuel cell 100 is higher than that during the normal operation of the fuel cell 100.

Modified example 3 will be described below. In the foregoing embodiments, the threshold temperature ThT is set to the temperature at the boundary between the temperature range in which the water balance at the cathode of each cell 110 is a positive value and the temperature range in which the water balance at the cathode of each cell 11 is a negative value. Alternatively, the invention may include any other embodiment. For example, the threshold temperature ThT may be set to a temperature higher or lower than the temperature at the boundary. When a threshold temperature ThT higher than the temperature at the boundary is set, the elapsed time Δt may be shortened, whereas when a threshold temperature ThT lower than the temperature at the boundary is set, the elapsed time Δt may be prolonged.

Modified example 4 will be described below. In the foregoing embodiments, the wet operation is terminated when any one of the three conditions 1 to 3 is satisfied. Alternatively, the invention may include any other embodiment. For example, the wet operation may be terminated when the amount of depression of the accelerator pedal increases to a prescribed value or larger after start of step S205, S205a, or S205b. In this modified example, the process may be executed as in the case where the condition 1 is satisfied. That is, the wet operation may be terminated when the electrolyte membrane 90 of the cell 110 is no longer in the dry state or when the electrolyte membrane 90 is allowed to enter the dry state.

Modified example 5 will be described below. In the foregoing embodiments, the fuel cell system 10 is mounted in a fuel cell vehicle and used as a driving electric power source. Alternatively, the invention may include any other embodiment. For example, the fuel cell system 10 may be mounted and used in any other vehicles that require a driving electric power source, such as an electric vehicle. Alternatively, the fuel cell system 10 may be used as a fixed electric power source in the interior or exterior of an office building or a house. The fuel cell 100 is a polymer electrolyte fuel cell in the foregoing embodiments. Alternatively, the fuel cell 100 may be various kinds of fuel cells such as a phosphoric acid fuel cell, a molten carbonate fuel cell, or a solid oxide fuel cell.

Modified example 6 will be described below. The fuel cell system 10 described in each of the foregoing embodiments is just one example, and may be modified in various forms. For example, a humidifier may be disposed on the oxidant gas supplying passage 331, at a position downstream of the air compressor 320, so that humidified air is supplied to the fuel cell 100. In this case, the water balance at the cathode of the cell 110 is specified by Expression (2):

water balance=the amount of produced water−the amount of carried-off water−the amount of forward diffused water+the amount of backward diffused water−the amount of water for humidification. Expression (2):

The second fuel gas discharging passage 264 may be separated from the oxidant gas discharging passage 332 such that these passages independently discharge off-gas. At least two of step S205 in the first embodiment, step S205a in the second embodiment, and step S205b in the third embodiment may be executed in combination. The combination of these steps more effectively prevents drying of the electrolyte membrane 90. The configuration implemented by hardware in each of the embodiments and modified examples may be partially implemented by software. Alternatively, the configuration implemented by software may be partially implemented by hardware. When part of or the entirety of the function in the invention is implemented by software, the software (computer program) may be provided in the form of a computer-readable recording medium containing the program. In the invention, "computer-readable recording medium" encompasses portable recording media, such as flexible disks and CD-ROMs, computer internal memories, such as RAMs and ROMs, and external storage devices fixed to computers, such as hard disk drives. That is, "computer-readable recording medium" encompasses recording media for temporary and long-term data storage.

The foregoing embodiments and modified examples should not be construed to limit the invention, and various forms may be made without departing from the scope of the invention. For example, the technical features described in the embodiments and modified examples corresponding to those of the aspects described in the section "Summary of the Invention" may be replaced or combined as needed in order to partially or completely solve the foregoing problems, or to partially or completely achieve the foregoing advantageous effects. Unless the technical features are described as essential ones in the specification, they may be omitted as needed.

What is claimed is:

1. A fuel cell system comprising:
   a fuel cell including an electrolyte membrane;
   a sensor configured to measure a temperature of the fuel cell; and
   a controller programmed to cause the fuel cell to perform a wet operation to increase a water balance at a cathode of the fuel cell to a value higher than a water balance at the cathode during a normal operation of the fuel cell, when the temperature of the fuel cell measured by the sensor is maintained at a first threshold temperature or higher for a prescribed period of time or longer and then the temperature of the fuel cell decreases to below a second threshold temperature that is equal to or lower than the first threshold temperature.

2. The fuel cell system according to claim 1, further comprising:
   a cathode off-gas discharging passage disposed in the fuel cell; and
   a pressure regulator configured to regulate a pressure in the cathode off-gas discharging passage,
   wherein the controller is programmed to cause the fuel cell to perform the wet operation by controlling the pressure regulator such that the pressure in the cathode off-gas discharging passage is increased to a value higher than a pressure in the cathode off-gas discharging passage during the normal operation of the fuel cell.

3. The fuel cell system according to claim 1, further comprising:

a cathode reactant gas supplier configured to supply a cathode reactant gas to the fuel cell, wherein the controller is programmed to cause the fuel cell to perform the wet operation by controlling the cathode reactant gas supplier such that a flow rate of the cathode reactant gas to be supplied to the fuel cell is decreased to a value lower than a flow rate of the cathode reactant gas to be supplied to the fuel cell during the normal operation of the fuel cell.

4. The fuel cell system according to claim 1, further comprising:

an anode reactant gas supplying passage through which an anode reactant gas is supplied to the fuel cell;

an anode off-gas discharging passage through which an anode off-gas from the fuel cell is discharged;

a circulation passage that connects the anode reactant gas supplying passage and the anode off-gas discharging passage to each other;

a pump disposed on the circulation passage, the pump being configured to supply at least a portion of the anode off-gas to the anode reactant gas supplying passage;

a cathode reactant gas supplying passage through which a cathode reactant gas is supplied to the fuel cell; and a cathode off-gas discharging passage through which a cathode off-gas from the fuel cell is discharged, wherein the cathode reactant gas is supplied to one side of the electrolyte membrane of the fuel cell and the anode reactant gas is supplied to the other side of the electrolyte membrane of the fuel cell, and a direction in which the cathode reactant gas is supplied to the fuel cell is opposite to a direction in which the anode reactant gas is supplied to the fuel cell, and wherein the controller is programmed to cause the fuel cell to perform the wet operation by controlling the pump such that a flow rate of the anode off-gas in the circulation passage is increased to a value higher than a flow rate of the anode off-gas in the circulation passage during the normal operation of the fuel cell.

5. The fuel cell system according to claim 1, further comprising:

an impedance meter configured to measure an impedance of the fuel cell, wherein the controller is programmed to start control for causing the fuel cell to perform the wet operation when the impedance measured by the impedance meter is a prescribed value or lower and the temperature of the fuel cell measured by the sensor is decreased from a temperature equal to or higher than the second threshold temperature to a temperature lower than the second threshold temperature.

6. The fuel cell system according to claim 1, wherein the first threshold temperature is a temperature at a boundary between a temperature range in which the water balance is a positive value and a temperature range in which the water balance is a negative value, under the same operation conditions other than the temperature of the fuel cell.

7. The fuel cell system according to claim 1, further comprising:

an impedance meter configured to measure an impedance of the fuel cell, wherein the controller is programmed to start control for causing the fuel cell to perform the wet operation when the temperature of the fuel cell measured by the sensor is decreased from a temperature equal to or higher than the second threshold temperature to a temperature lower than the second threshold temperature, and the controller is programmed to terminate the control for causing the fuel cell to perform the wet operation when any one of three conditions i) to iii) is satisfied:

i) the temperature of the fuel cell re-increases to the first threshold temperature or higher;

ii) the impedance of the fuel cell measured by the impedance meter increases to a value equal to or higher than a prescribed threshold that indicates a dry state of the fuel cell and then decreases to below the threshold, after the fuel cell starts to perform the wet operation; and iii) a prescribed period of time has elapsed after the fuel cell starts to perform the wet operation.

* * * * *